(12) United States Patent
Klug et al.

(10) Patent No.: US 11,833,743 B2
(45) Date of Patent: Dec. 5, 2023

(54) 3D PRINTER FOR PHOTOPOLYMERIZING A PHOTOSENSITIVE PLASTIC RESIN USING A LIGHTING PATTERN

(71) Applicant: AUDI AG, Ingolstadt (DE)

(72) Inventors: Markus Klug, Ingolstadt (DE); Tobias Moll, Ingolstadt (DE); Johannes Scheuchenpflug, Baar-Ebenhausen (DE)

(73) Assignee: AUDI AG, Ingolstadt (DE)

( * ) Notice: Subject to any disclaimer, the term of this patent is extended or adjusted under 35 U.S.C. 154(b) by 121 days.

(21) Appl. No.: 17/608,397

(22) PCT Filed: Apr. 30, 2020

(86) PCT No.: PCT/EP2020/062111
§ 371 (c)(1),
(2) Date: Nov. 2, 2021

(87) PCT Pub. No.: WO2020/225122
PCT Pub. Date: Nov. 12, 2020

(65) Prior Publication Data
US 2022/0203608 A1    Jun. 30, 2022

(30) Foreign Application Priority Data

May 3, 2019    (DE) .................... 10 2019 206 367.5

(51) Int. Cl.
*B29C 64/264*    (2017.01)
*B29C 64/129*    (2017.01)
(Continued)

(52) U.S. Cl.
CPC .......... *B29C 64/129* (2017.08); *B29C 64/245* (2017.08); *B29C 64/264* (2017.08); *B33Y 30/00* (2014.12)

(58) Field of Classification Search
CPC ............................ B29C 64/264; B29C 64/286
See application file for complete search history.

(56) References Cited

U.S. PATENT DOCUMENTS

| 8,663,539 B1 * | 3/2014 | Kolodziejska ........ B29C 64/129 264/401 |
| 2010/0060875 A1 | 3/2010 | Kwon et al. |

(Continued)

FOREIGN PATENT DOCUMENTS

| CN | 107462993 A | 12/2017 |
| DE | 20 2013 103 446 U1 | 10/2013 |

(Continued)

OTHER PUBLICATIONS

Examination Report dated Feb. 10, 2023 in related Chinese Patent Application No. 202080033526.3 (10 pages).

(Continued)

*Primary Examiner* — Timothy Kennedy
(74) *Attorney, Agent, or Firm* — STAAS & HALSEY LLP

(57) ABSTRACT

A 3D printing apparatus includes a synthetic resin bath for a photosensitive synthetic resin and a lifting apparatus. The photosensitive synthetic resin at the lifting apparatus is polymerizable by light of a specified wavelength. The 3D printing apparatus further includes a carrier medium having a coupling-in region and a coupling-out region, and an illumination apparatus to emit light onto the coupling-in region. The coupling-in region includes a coupling-in deflection structure to couple light of the specified wavelength incident on the coupling-in deflection structure from the illumination apparatus, into the carrier medium in a direction of the coupling-out region, and the coupling-out region is disposed below the synthetic resin bath and includes a coupling-out deflection structure configured to couple the light of the specified wavelength that is incident (Continued)

on the coupling-out deflection structure, as an exposure pattern, out of the carrier medium onto the photosensitive synthetic resin.

12 Claims, 2 Drawing Sheets

(51) Int. Cl.
  *B33Y 30/00* (2015.01)
  *B29C 64/245* (2017.01)

(56) References Cited

U.S. PATENT DOCUMENTS

| | | | |
|---|---|---|---|
| 2016/0067921 A1* | 3/2016 | Willis | B29C 64/124 |
| | | | 425/174 |
| 2019/0016050 A1* | 1/2019 | Stadlmann | B29C 64/295 |
| 2019/0084230 A1* | 3/2019 | Stadlmann | B29C 64/286 |
| 2019/0111622 A1 | 4/2019 | Khalip | |

FOREIGN PATENT DOCUMENTS

| | | |
|---|---|---|
| DE | 10 2015 225 300 A1 | 6/2017 |
| DE | 10 2019 206 367.5 | 5/2019 |
| JP | 2004-273203 A | 9/2004 |
| WO | 2017/181209 A1 | 10/2017 |
| WO | 2018/039688 A1 | 3/2018 |
| WO | PCT/EP2020/062111 | 4/2020 |

OTHER PUBLICATIONS

International Preliminary Report on Patentability and Written Opinion for International Application No. PCT/EP2020/062111 dated Nov. 2, 2021 (7 pages).
International Search Report for International Application No. PCT/EP2020/062111 dated Aug. 7, 2020 (15 pages with translation).
Germany Examination Report dated Dec. 16, 2019, for German Application No. 10 2019 206 367.5 (8 pages).

* cited by examiner

3D PRINTER FOR PHOTOPOLYMERIZING A PHOTOSENSITIVE PLASTIC RESIN USING A LIGHTING PATTERN

CROSS REFERENCE TO RELATED APPLICATIONS

This application is a U.S. national stage of International Application No. PCT/EP2020/062111, filed on Apr. 30, 2020. The International Application claims the priority benefit of German Application No. 10 2019 206 367.5 filed on May 3, 2019. Both International Application No. PCT/EP2020/062111 and German Application No. 10 2019 206 367.5 are incorporated by reference herein in their entirety.

BACKGROUND

Described herein is a 3D printing apparatus for photopolymerizing a photosensitive synthetic resin using an exposure pattern.

Known 3D printing methods include projecting light by using a projector onto a synthetic resin bath with a light-transmissive bottom from below, as a result of which the synthetic resin is hardened at the illuminated locations in accordance with an exposure pattern of the projector. In what is known as a "continuous liquid interface production" (CLIP) method, the hardened synthetic resin can here be drawn up in a step-wise manner, as a result of which more synthetic resin can flow into the forming gap at the bottom, which in turn can be exposed to light. In this way, a layer model can be formed step by step from synthetic resin.

A disadvantage of known CLIP methods so far is that the projector needs to be arranged at a distance from the synthetic resin bath to expose a large-area region of the synthetic resin bath, resulting in an increased space requirement.

SUMMARY

Described herein is a space-saving 3D printing apparatus.

The 3D printing apparatus may be achieved according to the examples described herein. Advantageous developments of the disclosure are disclosed in the following description, drawings, and claims.

Described herein is a 3D printing apparatus for photopolymerizing a photosensitive synthetic resin using an exposure pattern. The synthetic resin used may be for example a photopolymer, such as polypropylene or polyurethane. The 3D printing apparatus has a synthetic resin bath for the photosensitive synthetic resin and a lifting apparatus, wherein the photosensitive synthetic resin at the lifting apparatus is polymerizable by using light of a specified wavelength, for example ultraviolet light, as a hardened body and wherein the lifting apparatus is embodied to move the hardened body out of the synthetic resin bath, for example in a step-wise manner or continuously, to change an exposure plane of the photosensitive synthetic resin. The synthetic resin bath can in this case for example have a transparent bottom through which light, for example UV light, can travel. For example quartz glass can be used herefor.

The 3D printing apparatus furthermore may include a carrier medium, which is embodied to transmit, as a light guide, coupled-in light by internal reflection, and the 3D printing apparatus has a coupling-in region and a coupling-out region, which are arranged in different sections of the carrier medium. In other words, the carrier medium carries the coupling-in region and the coupling-out region. In addition, it is a light-guiding medium. Furthermore provided is an illumination apparatus, which is embodied to emit the light onto the coupling-in region.

The coupling-in region has a coupling-in deflection structure, which is designed to couple light of the specified wavelength that is incident from the illumination apparatus onto the coupling-in deflection structure into the carrier medium in the direction of the coupling-out region, wherein the coupling-out region is arranged underneath the synthetic resin bath and has a coupling-out deflection structure, which is embodied and arranged to couple the coupled-in light of the specified wavelength that is incident on the coupling-out deflection structure, as an exposure pattern, out of the carrier medium onto the photosensitive synthetic resin of the synthetic resin bath for photopolymerizing the synthetic resin.

In other words, an illumination apparatus, which may include, for example, a UV lamp or a UV light-emitting device, can emit light of a specified wavelength onto a coupling-in region of a carrier medium, wherein a coupling-in deflection structure of the coupling-in region can couple the light into a carrier medium. In the carrier medium, the light can then be guided to the coupling-out region by reflection, that is to say by total internal reflection, wherein the light can be coupled out at a coupling-out deflection structure of the coupling-out region through a light-transmissive bottom of the synthetic resin bath onto a photosensitive synthetic resin.

The photosensitive synthetic resin that has been exposed in this way can polymerize on account of the light, that is to say can harden, wherein this resulting hardened body can for example harden at an underside of a lifting apparatus. Subsequently, the lifting apparatus can move up by a specified distance or at a specified speed and/or by a specified step width, as a result of which a gap, into which more synthetic resin for photopolymerization can flow, can form between the hardened body and a bottom of the synthetic resin bath. The synthetic resin in the gap that has now flowed in can then subsequently be exposed again, thus enabling the creation, bit by bit, of a 3D print in accordance with an exposure pattern of the illumination apparatus.

The coupling-in deflection structure and the coupling-out deflection structure can be embodied in the form of a diffraction structure or refraction structure, in the form of an interference structure, grating structure, in the form of a lens system, or a mirror. For example, the coupling-in deflection structure and the coupling-out deflection structure can each be embodied in the form of a holographic optical element (HOE) (or, in short, holographic element), which can deflect light of a specified wavelength at a specified angle.

The lifting apparatus can be embodied in the form of a platform, which is sunk in the synthetic resin bath and can be connected, for example via a rail and/or a rope (or cable), to an electric motor that can pull the platform out of the synthetic resin bath in a step-wise or continuous manner, wherein the platform can be situated, in a starting position, in the vicinity of the bottom of the synthetic resin bath such that a gap is present between the platform and the bottom in which synthetic resin that is to be exposed can be located. Under exposure, the synthetic resin situated in the gap can polymerize, for example a layer of the synthetic resin can bond to the underside of the platform so that, when the platform is pulled out, the polymerized synthetic resin is pulled out with it.

The 3D printing apparatus described herein offers the advantage that a projection surface in the synthetic resin bath can be enlarged by the distribution of the light over the carrier medium without the need to enlarge a distance of the illumination apparatus or of a projector to the synthetic resin bath. It is in this way possible to enlarge a printing surface or exposure surface of the 3D printing apparatus without increased installation space being required for optical components that would have been necessary for example for beam expansion. It is thus possible to save on installation space in the case of the 3D printing apparatus.

The 3D printing apparatus also includes embodiments resulting in additional advantages.

An example embodiment makes provision for the coupling-in deflection structure and the coupling-out deflection structure to be embodied in the form of a holographic element with at least one optical grating, for example a volume holographic grating or a surface holographic grating.

A holographic element, also referred to as a holographic optical element (HOE), is an optical element whose operating principle is based on holography and which can be produced by using holographic methods, that is to say holographic exposure. To this end, an interference pattern produced from the superposition of two coherent waves having the same wavelength can be recorded on a light-sensitive layer. In this way, holographic elements, such as gratings, lenses, mirrors, and beam splitters, can be produced, which have similar properties to the known optical components. A holographic element can be embodied for example in the form of an optical grating, or diffraction grating.

Optical gratings, also referred to as diffraction gratings, and the mode of action and production method thereof are generally known. In principle, optical gratings can be embodied in a substrate in the form of at least regionally periodic structures, what are known as grating structures, that can cause, owing to the physical effect of diffraction, light guidance, as is known for example from mirrors, lenses, or prisms. If light is, that is to say if light beams are, incident on the optical grating, wherein the incident light beams for example satisfies the Bragg equation, the light beams are diffracted or deflected by the optical grating. The light can thus be guided for example by interference phenomena of the light beams diffracted by the optical grating. The deflection structure can accordingly also be referred to as a diffraction structure. A surface holographic grating and a volume holographic grating are holographic optical elements that can be produced for example by way of a holography method.

For example, an optical grating can be embodied to be angle-selective or direction-selective and/or wave-length-selective or frequency-selective with respect to the incident light. Thus, only light that is incident on an optical grating from a predetermined direction of incidence, for example at a predetermined angle, can be deflected. Light that is incident on the optical grating from a different direction may not be deflected, or is less deflected, the greater the difference from the predetermined direction of incidence is. Additionally or alternatively, it is also possible for only light of one wavelength or for light that deviates from the predetermined wavelength at most by a predetermined wavelength range to be deflected by the optical grating at a specific diffraction angle. In other words, for example an optimum wavelength may be specified, at which only a portion of the light in a specific wavelength or frequency range around the optimum wavelength is deflected by the optical grating (for example a central optimum wavelength and a region with wavelength values of up to +/−10 percent of the optimum wavelength), whereas the remaining portion of the light can propagate through the grating without being deflected. At least one monochromatic light portion can thus be split off from polychromatic light that is incident on the optical grating. The deflection effect thus arises in a frequency-selective and/or angle-selective manner, wherein the deflection effect is maximum for an optimum wavelength and decreases or becomes weaker toward longer and shorter wavelengths, for example decreases in the manner of a Gaussian bell. For example, the deflection effect only acts on a fraction of the visible light spectrum and/or in an angular range of less than 90 degrees.

For example, optical gratings can be produced by exposure of a substrate, that is to say for example photolithographically or holographically. In this context, the optical gratings can then also be referred to as holographic or holographic optical gratings. Two types of holographic optical gratings are known: surface holographic gratings (in short: SHG) and volume holographic gratings (in short: VHG). In the case of surface holographic gratings, the grating structure can be generated by optically deforming a surface structure of the substrate. Due to the modified surface structure, incident light can be deflected, for example reflected. Examples of surface holographic gratings are what are known as sawtooth or blazed gratings. In contrast to this, the grating structure in the case of volume holographic gratings can be incorporated into the entire volume or part of the volume of the substrate. Surface holographic gratings and volume holographic gratings are usually frequency-selective.

Material that may be suitable for a substrate for incorporation of an optical grating is, for example, glass, for example quartz glass. Alternatively or additionally, a polymer, for example a photopolymer, or a film, for example a photosensitive film, for example made of plastic or an organic substance, can also be used. In order to use such substrates, it should additionally be noted that the material, for example in substrate form, has flexible and optical wave-guiding properties. Substrates that have a deflection structure for diffracting light, for example in the form of an optical grating, can also be referred to as holographic optical elements (HOE).

A further embodiment makes provision for the illumination apparatus to furthermore have an infrared emitter, wherein the coupling-in deflection structure and the coupling-out deflection structure are embodied in the form of a multiplex diffraction structure, which is embodied to diffract light of at least the specified wavelength and light of the infrared emitter at a predetermined angle. In other words, in addition to a light source emitting light of the specified wavelength for the photopolymerization of the synthetic resin, the illumination apparatus can include an infrared emitter that can, for example, heat the synthetic resin and thus liquefy the regions of the synthetic resin that do not correspond to the exposure pattern with the first specified wavelength. For this purpose, the coupling-in deflection structure and the coupling-out deflection structure can for example be embodied in the form of a multiplex diffraction structure.

A diffraction structure, for example an optical grating, is generally frequency-selective. However, optical gratings that can diffract polychromatic light are also known. These are called multiplexed volume holographic gratings (in short: MVHG) and can be produced, for example, by changing the periodicity of the grating structure of an optical grating or by arranging a plurality of volume holographic gratings one behind the other, which produces a multiplex diffraction structure.

This embodiment offers the advantage that a temperature of the synthetic resin bath can be maintained in order to maintain a viscosity of the synthetic resin without the use of space-requiring heating apparatuses.

A further embodiment makes provision for the coupling-in region and the coupling-out region to be formed in one piece with the carrier medium, or for the carrier medium to be formed as a separate element from the coupling-in region and the coupling-out region. In the first case, the coupling-in region and the coupling-out region can thus, for example, be incorporated directly into a surface structure of the carrier medium. Consequently, the carrier medium itself can be embodied in the form of a HOE, for example can be etched or lasered. In the second case, the carrier medium can be embodied separately from the coupling-in region and the coupling-out region. In this case, the coupling-in region and the coupling-out region can in each case form, for example, one element, and the carrier medium can form a different element, which adjoins the respective elements. The coupling-in region and the coupling-out region can thus be formed in at least one HOE. This allows a greater choice when using a carrier medium. By way of example, the coupling-in region and the coupling-out region can be formed in different sections of a holographic film or plate. To fasten the film or plate to the carrier medium, the film or the plate can be adhesively bonded to the carrier medium. Alternatively, the holographic film can also be embodied in the form of an adhesive film and adhere to the surface of the carrier medium directly, that is to say without adhesive, by molecular forces.

A further embodiment makes provision for the coupling-in region to have a smaller dimension than the coupling-out region, wherein the coupling-in deflection structure has a scattering grating structure that is embodied to deflect light beams of the light that is incident on the coupling-in deflection structure to different extents depending on a site of incidence, so that the coupling-in deflection structure fans out the light beams onto the coupling-out deflection structure, and wherein the coupling-out deflection structure has a focusing grating structure that is embodied to deflect light beams of the light to different extents in dependence on the site of incidence and to parallelize or focus them onto the photosensitive synthetic resin of the synthetic resin bath in order to couple them out of the carrier medium. In other words, light that is incident on the coupling-in deflection structure can be spread to a dimension of the coupling-out region.

A scattering grating structure can have an inhomogeneous diffraction structure that can diffract for example light beams from a periphery of the diffraction structure more strongly than light beams from a center of the diffraction structure, as a result of which the light beams can be fanned out. Accordingly, a focusing grating structure can have a grating structure in which light beams can be focused depending on the incident position. In this embodiment, the focusing grating structure and the scattering grating structure and the corresponding distances between the two structures are for example selected such that the light beams diverge from the scattering grating structure to the focusing grating structure and are parallelized again by the focusing grating structure. This arrangement is comparable to a Galilean telescope, in which a diverging lens and a scattering lens are arranged one behind the other so that the focal lengths of the two lenses coincide in one point downstream of the scattering lens. This embodiment offers the advantage that light can be distributed over a large surface without requiring more space for fanning out the light beams. In addition, it is thus possible to once again direct a fanned-out light beam onto the synthetic resin bath in a parallel manner, which can increase the precision of a 3D print.

An example embodiment makes provision for the illumination apparatus to have a projector with an interchangeable photomask, which projector is embodied to establish an emission characteristic forming the exposure pattern for exposing the synthetic resin. The interchangeable photomask of the projector can serve as a negative image that can generate the exposure pattern for irradiating the synthetic resin, wherein the interchangeable photomask can for example be interchanged, according to a de-sired exposure pattern, by using an interchanging apparatus, for example similar to a slide projector. The projector can furthermore be embodied to change an intensity of the projector image over a large area or in a partial region of the projector image by way of a variable exposure time. This embodiment offers the advantage that it is possible using the interchangeable photomask to establish a variable emission characteristic, with which regions can be exposed for longer or more strongly.

An example embodiment makes provision for the illumination apparatus to have a focus device, which is embodied to emit focused light beams, that is to say converging light beams, onto the coupling-in region, wherein the focused light beams, after they have been transmitted through the carrier medium to the coupling-out region and after they have emerged from the coupling-out region, intersect in a focal plane in the synthetic resin bath. In other words, the illumination apparatus can include a focus device, for example a lens or a lens system, which can focus light beams. Using the focus device, the light beams can be focused such that a focal point, that is to say the point at which the light beams intersect, or a focal plane lies in the synthetic resin bath. For example, an intensity of the light beams can be selected such that hardening of the synthetic resin in the synthetic resin bath does not occur until the focal plane. This embodiment offers the advantage that, between the bottom of the synthetic resin bath and the lifting apparatus, a relatively large gap can be present that can then be hardened, that is to say photopolymerized, by setting the focal plane for example downward from the top, that is to say from the lifting apparatus to the bottom of the synthetic resin bath. However, it is also possible that two or more focal planes can be hardened simultaneously by suitably setting the focus device, which enables faster 3D printing.

An example embodiment makes provision for the illumination apparatus to have a scanning apparatus with a light source, which is embodied to polymerize the photo-sensitive synthetic resin by scanning the coupling-in region in accordance with a scanning position of the scanning apparatus. The scanning apparatus can have, for example, a movable illumination strip or a laser with deflection mirrors, wherein the scanning apparatus can emit the light in accordance with a desired exposure pattern into the coupling-in region, from where it can then be guided further through the carrier medium to the corresponding location of the synthetic resin bath for hardening the synthetic resin. In this embodiment, too, it is possible that a variable exposure time for a desired emission characteristic is provided. This embodiment offers the advantage that it is possible to quickly modify a desired exposure pattern per layer of the 3D print.

An example embodiment makes provision furthermore for a camera apparatus to be provided, which is arranged adjacent to the illumination apparatus and is embodied to record at least one image of a polymerization state of the synthetic resin for monitoring the photopolymerization by virtue of the fact that the camera apparatus records the image of the polymerization state of the synthetic resin which falls from the synthetic resin bath back via the coupling-out region, the carrier medium, and the coupling-in region into the camera apparatus. In other words, the same path on which the light of the specified wavelength is guided from the illumination apparatus into the synthetic resin bath, that is to say the coupling-in region, the carrier medium, and the coupling-out region, can be used to guide light back from the synthetic resin bath, wherein, in addition to the illumination apparatus, a camera apparatus that records this light for recording an image can be provided. For example, a polymerization state, that is to say a current hardening of the synthetic resin, can be recorded, by way of which monitoring of the hardening, that is to say of the photopolymerization, can take place. This embodiment offers the advantage that monitoring of the 3D printing process can be performed and any errors that may occur can be corrected or avoided. This can improve the quality of the 3D print.

A further embodiment makes provision for the carrier medium to form a bottom of the synthetic resin bath. In other words, the bottom, for example the transparent bottom of the synthetic resin bath, can be formed from the carrier medium, wherein the coupling-out region for example makes up the majority of the bottom of the synthetic resin bath. It is hereby possible to save space, because a large-area distribution of the light over the carrier medium and thus of the synthetic resin bath is made possible.

The disclosure also includes the combinations of the features of the example embodiments described herein.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
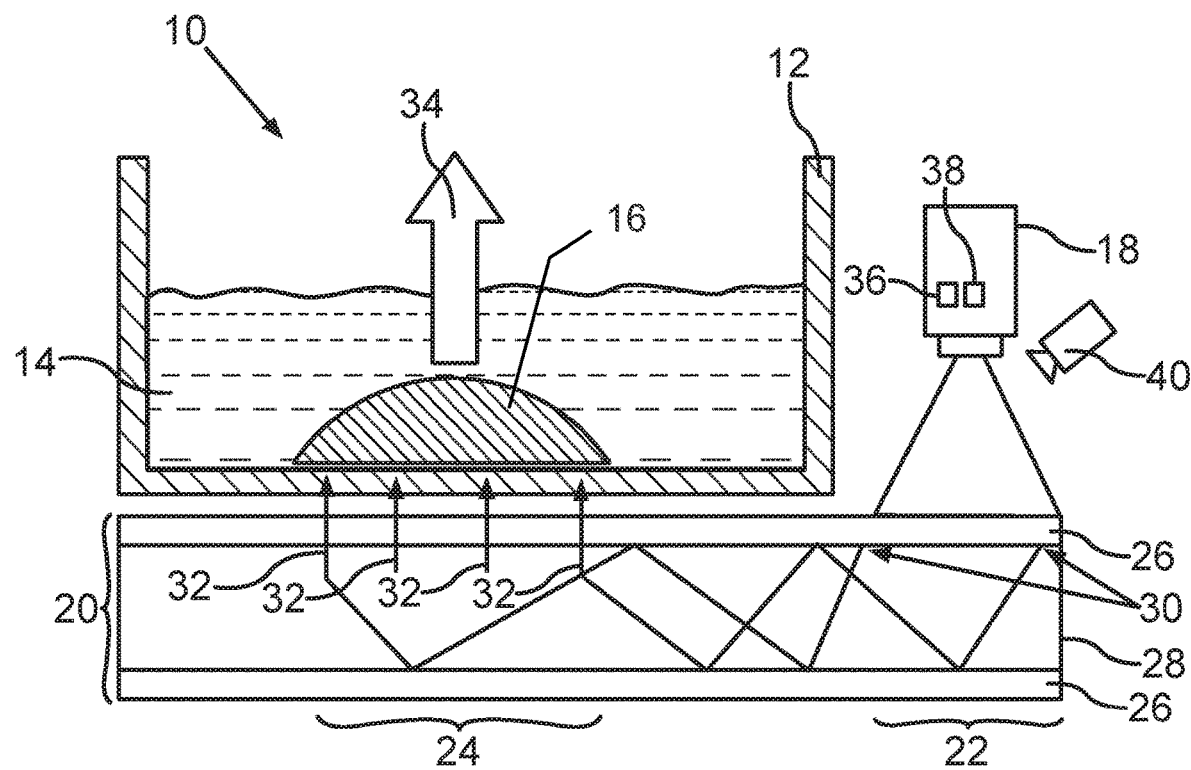
FIG. 1 is a schematic cross-sectional view of an example embodiment.

Reference will now be made in detail to example embodiments, the examples of which are illustrated in the accompanying drawings, wherein like reference numerals refer to like elements throughout.

The embodiments discussed below are example embodiments. In the example embodiments, the described components of the embodiments each represent individual features that should be considered independently of one another and also develop the disclosure in each case independently of one another. The disclosure is therefore also intended to include combinations of the features of the embodiments other than those illustrated. Furthermore, the described embodiments may also be supplemented by further features that have already been described.

In the drawings, identical reference signs each denote elements of identical function.

FIG. 1 illustrates a schematic cross-sectional view of a 3D printing apparatus 10 according to an example embodiment. The 3D printing apparatus 10 has a synthetic resin bath 12, in which photosensitive synthetic resin 14 can be located.

The synthetic resin 14 can polymerize, that is to say harden, by using light, for example by using light of a specific wavelength, such as UV light, in order to form a hardened body 16, which may be an object 16 to be printed, for example a synthetic resin structure.

The 3D printing apparatus 10 can furthermore have an illumination apparatus 18, which can be embodied to emit light of the specified wavelength.

Beneath the synthetic resin bath 12, a carrier medium 20 can be arranged, which can have a coupling-in region 22 and a coupling-out region 24. The carrier medium 20 can be formed for example by using a layer construction, wherein two light guiding elements 26, such as glass or plastics plates, can form the cover layers 26 for a holographic optical element 28, or, for short, holographic element 28. Alternatively or additionally, the holographic element 28 can also be produced by stacking a plurality of holographic elements.

The holographic element 28 can be, for example, a photopolymer film or a glass that is introduced, for example adhesively bonded, between the two cover layers 26. The holographic element 28 can furthermore be formed by holographic exposure methods such that deflection structures are formed, such as for example a volume holographic grating or a surface holographic grating.

It is thus possible to produce in the coupling-in region 22 a coupling-in deflection structure 30, which is designed to couple light of the specified wavelength from the illumination apparatus 18 into the carrier medium 20 in the direction of the coupling-out region 24. In the direction of the coupling-out region here means a macroscopic direction from the measurement region along the carrier medium to the coupling-out region 24, or a directional vector in the propagation direction of the light by internal reflection. Guiding further by internal reflection means that the coupled-in light beams meet a critical-angle condition for total internal reflection. An optical path can here of course have a zigzag motion due to the internal reflection.

Furthermore, the coupling-in deflection structure 30 can have a scattering grating structure that deflects light beams of the light that is incident on the coupling-in deflection structure 30 to different extents depending on a site of incidence, so that the light beams are fanned out onto a coupling-out deflection structure 32 of the coupling-out region. The coupling-out deflection structure 32 can be formed from the same holographic optical element 28 by virtue of the fact that, in the coupling-out region 24, the holographic optical element 28 was exposed by using holographic exposure methods such that an optical grating, for example a volume holographic grating or a surface holographic grating, is formed. The coupling-out deflection structure 32 is embodied to couple the light, which is coupled into the carrier medium 20 and is incident on the coupling-out deflection structure 32, out of the carrier medium 20 into the synthetic resin bath 12 for photopolymerizing the synthetic resin. For example, the coupling-out deflection structure 32 can have a focusing grating structure that deflects light beams of the light to different extents in dependence on the site of incidence and thus parallelizes or focuses the light beams, which were fanned out by the coupling-in deflection structure 30, again. Consequently, the coupling-in deflection structure 30 and the coupling-out deflection structure 32 can be used as a beam expander.

In this way, light of the specified wavelength, which is emitted by the illumination apparatus 18 onto the coupling-in region 22, can be coupled into the carrier medium 20 by the coupling-in deflection structure 30 and be guided further by internal reflection to the coupling-out region 24, where it can then be emitted from the coupling-out deflection structure 32 in a region that is enlarged compared to the coupling-in region 22 into the synthetic resin bath 12, where it can harden a layer of the synthetic resin 14.

The synthetic resin 14 can for example harden on an underside of a lifting apparatus 34, wherein the lifting apparatus 34 can pull the object 16 that is formed in this way layer by layer out of the synthetic resin bath 12, as a result of which more synthetic resin 14 can flow into a gap between a bottom of the synthetic resin bath and the object 16, where the flowed-in synthetic resin 14 can then be exposed again. In this way, the object 16 can be formed in a step-wise or continuous manner.

The illumination apparatus 18 can include a light source 36, which can be, for example, a projector with an interchangeable photomask. By way of the photomask, for example an emission characteristic forming the exposure pattern can be established for exposing the synthetic resin. Furthermore, the illumination apparatus 18 can have an infrared emitter 38. The infrared emitter 38 can be embodied for example to emit infrared light onto the coupling-in deflection structure 30, wherein the coupling-in deflection structure 30 can for example also be embodied in the form of a multiplex diffraction structure, which means that, in addition to the light of the specified wavelength, it can also couple light of the infrared emitter 38 into the carrier medium 20. The coupling-out deflection structure 32 can also be embodied in the form of a multiplex diffraction structure, which can diffract at least the light of the specified wavelength and the light of the infrared emitter at a predetermined angle, with the result that the light of both wavelengths can be emitted onto the synthetic resin 14.

In addition to the illumination apparatus 18, a camera apparatus 40 can be provided, which is embodied to record at least one image of a polymerization state of the synthetic resin in order to monitor a manufacturing process of the 3D print. For this purpose, the camera apparatus 40 can detect for example light, which is reflected by the object 16 and is transmitted back via the coupling-out region, the carrier medium, and the coupling-in region. In this way, an image of the current polymerization state of the synthetic resin can be recorded, and for example possible errors can be detected and corrected by controlling the illumination apparatus 18 so as to change the exposure pattern. In addition, the recorded layer image can be analyzed and compared to a digital layer image. If deviations are established, such as warping or holes, this can be compensated for by correction measures, such as for example a change in the exposure time, in the exposure strength, and/or a modification of the exposure pattern.

Figure 2:
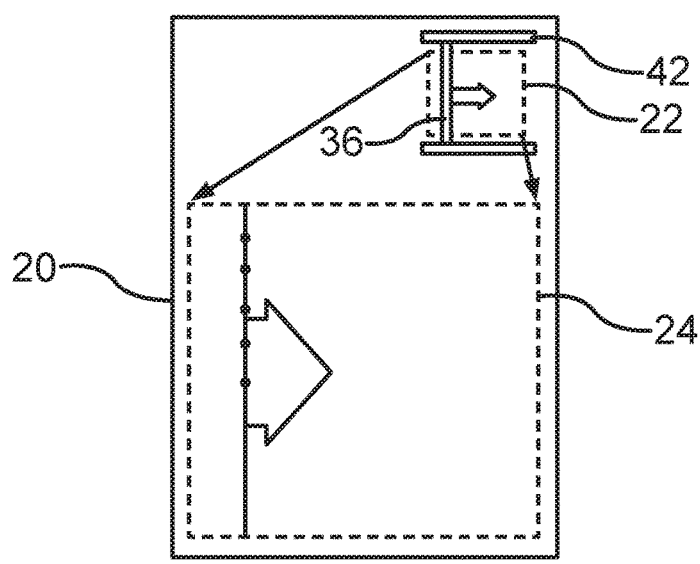
FIG. 2 is a schematic illustration of an example embodiment.

FIG. 2 shows a schematic illustration of an example embodiment. This illustration shows a plan view of a carrier medium 20 with a coupling-in region 22 and a coupling-out region 24. In this embodiment, the illumination apparatus 18 can have, for example, a scanning apparatus 42 with the light source 36. In this embodiment, the scanning apparatus 42 can be, for example, a guidance rail system, which can move the light source 36, which in this embodiment is embodied in the form of an exposure strip 36, over the coupling-in region 22 and can provide suitable exposure for generating the exposure pattern depending on the position. To this end, it is also possible, for example, to realize a variable exposure time for a respective position of the exposure strip 36.

By fanning out the light from the coupling-in region 22 to the coupling-out region 24, it is additionally possible to ensure that, by scanning the comparatively small coupling-in region 22, the by comparison therewith large coupling-out region 24 is scanned, which is indicated by the arrows pointing to the right.

Figure 3:
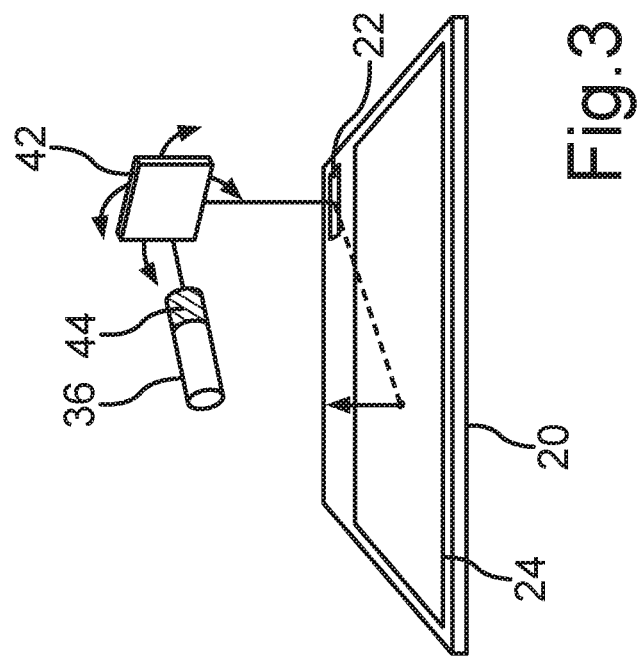
FIG. 3 is a schematic illustration of an example embodiment.

FIG. 3 shows a schematic illustration of a further example embodiment. This illustration shows again the carrier medium 20 with the coupling-in region 22 and the coupling-out region 24. In this embodiment, the illumination apparatus 18 can have a deflection mirror as the scanning apparatus 42, which deflection mirror for example can be tilted by using a piezoelectric element and can thus deflect a light beam coming from the light source 36, which can be for example a laser. Light beams from the light source 36 can thus be coupled into the carrier medium via the deflection mirror 42 onto a location of the coupling-in region 22 and be coupled out at a corresponding location of the coupling-out region 24. For example, a focus device 44 can also be provided, which can focus light beams from the light source 36 in the direction of the coupling-in region, wherein the focused light beams, after they have been transmitted through the carrier medium to the coupling-out region 24 and after they have emerged from the coupling-out region, intersect in a focal plane downstream of the coupling-out region 24, wherein the focal plane can for example be located within the synthetic resin bath 12, as a result of which for example different or a plurality of layers can be exposed simultaneously.

Figure 4:
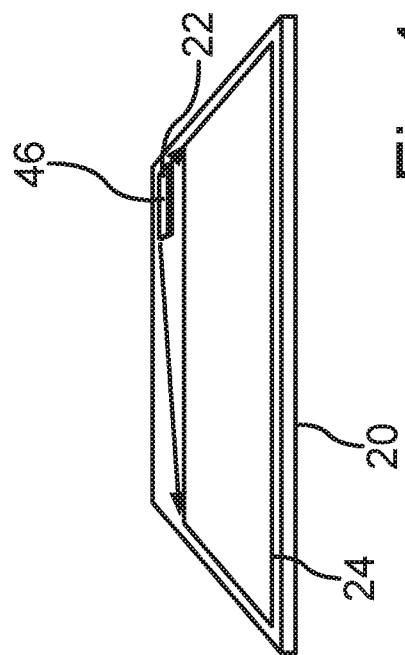
FIG. 4 is a schematic illustration of an example embodiment.

FIG. 4 shows a schematic illustration of an example embodiment. In this embodiment, the carrier medium 20 can have, in the coupling-in region 22, a photo-diode matrix 46 that is located thereabove and can include, for example, an LED matrix or OLED matrix. In this way, for example an exposure pattern can be emitted from the photodiode matrix 46 directly into the coupling-in region 22. Next, after the exposure pattern is guided further through the carrier medium 20, it can be guided into the synthetic resin bath over a large area via the coupling-out region 24 in order to expose the synthetic resin 14 there.

Overall, the examples show how a 3D printing can be provided by a 3-D printing apparatus using a holographic optical element.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in *Superguide v. DIRECTV,* 358 F3d 870, 69 USPQ2d 1865 (Fed. Cir. 2004). That is the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C. In addition, the term "and/or" includes a plurality of combinations of relevant items or any one item among a plurality of relevant items. That is, the scope of the expression or phrase "A and/or B" includes all of the following: (1) the item "A", (2) the item "B", and (3) the combination of items "A and B".

The invention claimed is:

1. A 3D printing apparatus for photopolymerizing a photosensitive synthetic resin using an exposure pattern, the 3D printing apparatus comprising:
   a synthetic resin bath in which the photosensitive synthetic resin is provided;
   a lifting apparatus, wherein the photosensitive synthetic resin at the lifting apparatus is polymerizable by light of a specified wavelength as a hardened body, the lifting apparatus being configured to move the hardened body up and out of the synthetic resin bath to change an exposure plane for the photosensitive synthetic resin with respect to the hardened body;

a carrier medium configured to transmit as a light guide light by internal reflection, and including a coupling-in region and a coupling-out region which are disposed in different sections of the carrier medium; and an illumination apparatus configured to emit the light onto the coupling-in region, wherein the coupling-in region includes a coupling-in deflection structure configured to couple light of the specified wavelength that is incident on the coupling-in deflection structure from the illumination apparatus, into the carrier medium in a direction of the coupling-out region, and the coupling-out region is disposed below the synthetic resin bath and includes a coupling-out deflection structure configured to couple the light of the specified wavelength that is incident on the coupling-out deflection structure, as an exposure pattern, out of the carrier medium onto the photosensitive synthetic resin of the synthetic resin bath to photopolymerize the photosensitive synthetic resin.

2. The 3D printing apparatus as claimed in claim 1 wherein the coupling-in deflection structure and the coupling-out deflection structure are each configured as a holographic element including at least one optical grating.

3. The 3D printing apparatus as claimed in claim 2, wherein the at least one optical grating of the coupling-in deflection structure includes a volume holographic grating or a surface holographic grating, and the at least one optical grating of the coupling-out deflection structure includes the volume holographic grating or the surface holographic grating.

4. The 3D printing apparatus as claimed in claim 2, wherein the illumination apparatus includes an infrared emitter, and the coupling-in deflection structure and the coupling-out deflection structure are each configured as a multiplex diffraction structure, which is configured to diffract light of at least the specified wavelength and light of the infrared emitter at a predetermined angle.

5. The 3D printing apparatus as claimed in claim 1, wherein the coupling-in region and the coupling-out region are formed as one piece with the carrier medium, or the carrier medium is formed as a separate element from the coupling-in region and the coupling-out region.

6. The 3D printing apparatus as claimed in claim 1, wherein the coupling-in region is smaller than the coupling-out region, the coupling-in deflection structure includes a scattering grating structure configured to deflect light beams of the light that is incident on the coupling-in deflection structure to different extents based on a site of incidence, so that the coupling-in deflection structure fans out the light beams onto the coupling-out deflection structure, and the coupling-out deflection structure includes a focusing grating structure configured to deflect light beams of the light to different extents based on the site of incidence and to parallelize or focus the light beams onto the photosensitive synthetic resin of the synthetic resin bath to couple the light beams out of the carrier medium.

7. The 3D printing apparatus as claimed in claim 1, wherein the illumination apparatus includes a projector with an interchangeable photomask, and the projector is configured to establish an emission characteristic forming the exposure pattern for exposing the photosensitive synthetic resin.

8. The 3D printing apparatus as claimed in claim 1, wherein the illumination apparatus includes a focus device configured to emit focused light beams onto the coupling-in region, and the focused light beams, after they have been transmitted through the carrier medium to the coupling-out region and after they have emerged from the coupling-out region, intersect in a focal plane in the synthetic resin bath.

9. The 3D printing apparatus as claimed in claim 1, wherein the illumination apparatus includes a scanning apparatus with a light source, and the scanning apparatus is configured to polymerize the photosensitive synthetic resin by scanning the coupling-in region based on a scanning position of the scanning apparatus.

10. The 3D printing apparatus as claimed in claim 1, further comprising:

a camera apparatus disposed adjacent to the illumination apparatus and configured to record an image of a polymerization state of the photosensitive synthetic resin to monitor photopolymerization by recording light of the image of the polymerization state of the photosensitive synthetic resin which is reflected back from the synthetic resin bath through the coupling-out region, the carrier medium, and the coupling-in region, and into the camera apparatus.

11. The 3D printing apparatus as claimed in claim 1, wherein the carrier medium forms a bottom of the synthetic resin bath.

12. The 3D printing apparatus as claimed in claim 1, wherein the carrier medium forms a bottom of the synthetic resin bath, the carrier medium is transparent, and an area of the coupling-in region is smaller than an area of the coupling-out region.

* * * * *